US010247354B2

(12) United States Patent
Mueller

(10) Patent No.: US 10,247,354 B2
(45) Date of Patent: Apr. 2, 2019

(54) CORNER SHIELD

(71) Applicant: Jens Mueller, Cathedral City, CA (US)

(72) Inventor: Jens Mueller, Cathedral City, CA (US)

(*) Notice: Subject to any disclaimer, the term of this patent is extended or adjusted under 35 U.S.C. 154(b) by 82 days.

(21) Appl. No.: 15/428,146

(22) Filed: Feb. 8, 2017

(65) Prior Publication Data
US 2018/0220799 A1 Aug. 9, 2018

(51) Int. Cl.
F16M 11/00 (2006.01)
F16M 11/38 (2006.01)
A47B 95/04 (2006.01)

(52) U.S. Cl.
CPC ........... *F16M 11/38* (2013.01); *A47B 95/043* (2013.01)

(58) Field of Classification Search
CPC .......................... B65D 81/057; B65D 81/053
USPC ................ 248/220.1, 345.1; 52/287.1, 288.1
See application file for complete search history.

(56) References Cited

U.S. PATENT DOCUMENTS

| 4,603,517 | A | 8/1986 | Lyons, Jr. |
| 4,640,864 | A | 2/1987 | Porter |
| 6,354,049 | B1 * | 3/2002 | Bennett ................. E04F 19/028 52/287.1 |
| D517,226 | S * | 3/2006 | Zarb .......................... D25/136 |
| 7,226,027 | B1 * | 6/2007 | Feeley ................... A47G 7/044 248/220.1 |
| 7,350,646 | B2 | 4/2008 | Durrant |
| 7,578,370 | B1 * | 8/2009 | Morton .................... E04G 5/04 182/82 |
| 7,866,102 | B2 | 1/2011 | Meahl |
| 7,997,043 | B1 | 8/2011 | MacMillan et al. |
| 8,636,930 | B2 | 1/2014 | Chujo et al. |
| 9,434,524 | B2 * | 9/2016 | Kindig ................. B65D 81/053 |
| 2011/0094174 | A1 * | 4/2011 | Meahl ..................... E04F 19/04 52/288.1 |
| 2012/0025049 | A1 * | 2/2012 | Kim ..................... A47B 95/043 248/345.1 |
| 2012/0118844 | A1 * | 5/2012 | Wians ................... A47F 5/0018 211/183 |
| 2015/0259929 | A1 * | 9/2015 | Koenig, Jr. ........... E04F 19/022 52/287.1 |

FOREIGN PATENT DOCUMENTS

DE 10025171 A1 11/2001

* cited by examiner

*Primary Examiner* — Steven M Marsh
(74) *Attorney, Agent, or Firm* — Edwin H. Crabtree; Ramon L. Pizarro

(57) ABSTRACT

A corner shield for protecting corners of objects for placement on a substantially horizontal surface comprising a body and an elongated protector. The body comprises inner and outer support sections with a slot therebetween for receiving an elongated protector. The slot has an outer section and an inner section with the outer section angled inwardly from bottom to top by a sloped angle of at least 2 degrees from perpendicular relative to the surface.

12 Claims, 11 Drawing Sheets

CORNER SHIELD

BACKGROUND

The corners of many objects, such as adjoining sections in a building, are susceptible to damage, particularly during moving furniture or construction. Information related to such devices can be found in U.S. Pat. No. 7,866,102 to Meahl, U.S. Pat. No. 4,603,517 to Lyons Jr., and DE10025171 A1 to Heck. None of these references addresses the problem of corners/structures being damaged during moving of furniture or construction.

There is a need for a device that can shield the corners from damage, where the device is inexpensive, easy to use, adaptable for multiple sized and shaped corners, causes the shielding device to remain against a corner without use of tape or adhesives so that surfaces are not marred and the device can be moved from corner to corner as needed.

SUMMARY

The present invention is directed to a corner shield that satisfies this need. It is designed for placement on a substantially horizontal surface proximate to a corner to be protected, and comprises a body and an elongated protector. The body comprises an inner support and an outer support, and a slot between the supports. The inner support comprises two sections connected together at an inner support corner with a corner angle of at least 30 degrees, and typically a 90 degree right angle, the inner support having an outer surface. The outer support likewise comprises two sections connected together at an outer support corner with the corner angle. The other support has an inner surface. The slot is between the inner surface of the outer support and the inner surface of the inner support. The slot has a top and a bottom. The inner surface of the outer support is angled inwardly from the bottom to top by a slope angle from about at least 2 degrees, and up to about 10 degrees from perpendicular relative to the surface. The slot has a height and two sections connected together at a slot corner with the corner angle.

An elongated protector is shaped for fitting into the slot. The protector is longer than the slot height. The protector has two sections connected together at a protector corner with the corner angle. Optionally the protector can be provided with the two separate sections, wherein when inserted into the slot the sections are proximate to each other at the slot corner with the corner angle.

In use, the protector is placed proximate to the corner of an object to be protected, extending along the intersecting sections of the object, with the elongated protector fitted into the slot.

Preferably the outer support has a bottom and the body comprises a flange extending from the bottom of the outward support outwardly for preventing the corner shield from tipping over. An elastomer can be on the bottom of the flange for anti-slip purposes.

Preferably the top of the slot is wider than the bottom of the slot, such as the top of the slot being one-half inch wide and the bottom of the slot being less than ⅛ inch wide. This allows the bodies to be stacked on top of each other and for ease of placement of the protector into the slot. For example, each support section can have a bottom corner with a first distance between the bottom corner and the protector corner, and each section of the slot can have a top corner with a second distance between the top corner and the slot corner, where the second distance is at least one inch greater than the first distance. Preferably the slot is V-shaped.

Preferably the body is sufficiently large to accommodate protectors of different sizes, such as protectors having sections of six inches. Thus, protectors can have sections of any length up to six inches. The protector can be formed of cardboard and, for appearance, can have an exterior at least the surface of the protector covered with paper.

The outer support can have an outer surface that is curved, such as having end sections that are rounded, for tying cables or ropes thereon without having a sharp angle that could damage the tie.

There can be a cavity at at least one end of the outer support with a weight in the cavity for stability, the weight being from about two to about eight ounces. Preferably there is such a cavity at each end of the outer support. The cavity need not be at the end, but can be optionally at any location on the bottom of the outer support.

The inner and outer supports each have end edges, where typically the end edges of the inner support are connected to the corresponding end edges of the outer support to provide a body with a unitary construction. Thus, the body, including any flange, can be provided as a unitary structure, typically made of a rigid material.

There can be shield material, such as felt or rubber, on an outer surface of the inner support for shielding against marring of the structure in use of the corner shield.

In an alternate version of the invention, rather than having both an inner support and outer support, the can be only one support having an outer surface and an inner surface, with a protector holder coupled to the outer surface or the inner surface or both surfaces. The protector holder is angled from bottom to top by a slope angle of at least 2 degrees from perpendicular relative to the surface on which the body is placed to tilt the protector towards the corner being protected.

In another alternate version of the invention, referred to as a hinged version, the corner shield comprises body comprising a support comprising two walls connected together at a corner by a hinge, the hinge allowing a corner angle of at least 30 degrees up to 170 degrees, the support having an outer surface and an inner surface. A protector holder is coupled to the outer surface or the inner surface, wherein the protector holder is angled from bottom to top by a slope angle of at least 2 degrees from perpendicular relative to the surface on which the body is to be placed to tilt the protector toward the corner. Alternatively, the protector holder can be an inner support comprising two sections proximate to each other at an inner support corner with the corner angle, the inner support having an inner surface, there being a slot having a top and a bottom, the slot being between the inner surface of the outer support and the inner surface of the inner support, the inner surface of the outer support being angled inwardly from bottom to top by a slope angle of at least 2 degrees from perpendicular relative to the surface, the slot having a height and two sections connected together at a slot corner with the corner angle.

Alternatively, a corner shield according to the present invention can comprise two internal surfaces, two external surfaces, a flange, and a receiving slot. Each internal surface comprises a top edge, a bottom edge, an inner edge and an outer edge, wherein the two internal surfaces are coupled together at about a 90 degree angle with respect to each other along their inner edges, the two internal surfaces each having a longitudinal axis perpendicular to a surface upon which the corner shield can be placed. Each external surface comprises a top edge, a bottom edge, an inner edge and an outer edge, wherein the two external surfaces are coupled together at about a 90 degree angle with respect to each other along their inner edges. The top edge of each external surface is coupled to the top edge of its corresponding internal surface and the outer edge of each external surface is coupled to the outer edge of its corresponding internal surface. The flange is coupled to and extends away from the bottom edges of the external surfaces to prevent the corner shield from tipping over. The receiving slot is disposed along the top edges of each internal surface and has an angle of about 2 degrees with respect to the vertical axes of the two internal surfaces.

The invention can also be provided as a kit comprising the corner shield body and at least two protectors wherein at least one protector has a size different from another protector in height or width or both of at least one inch.

DRAWINGS

These and other features, aspects, and advantages of the present invention will become better understood with reference to the following description, appended claims, and accompanying drawings where:

DESCRIPTION

Figure 1:
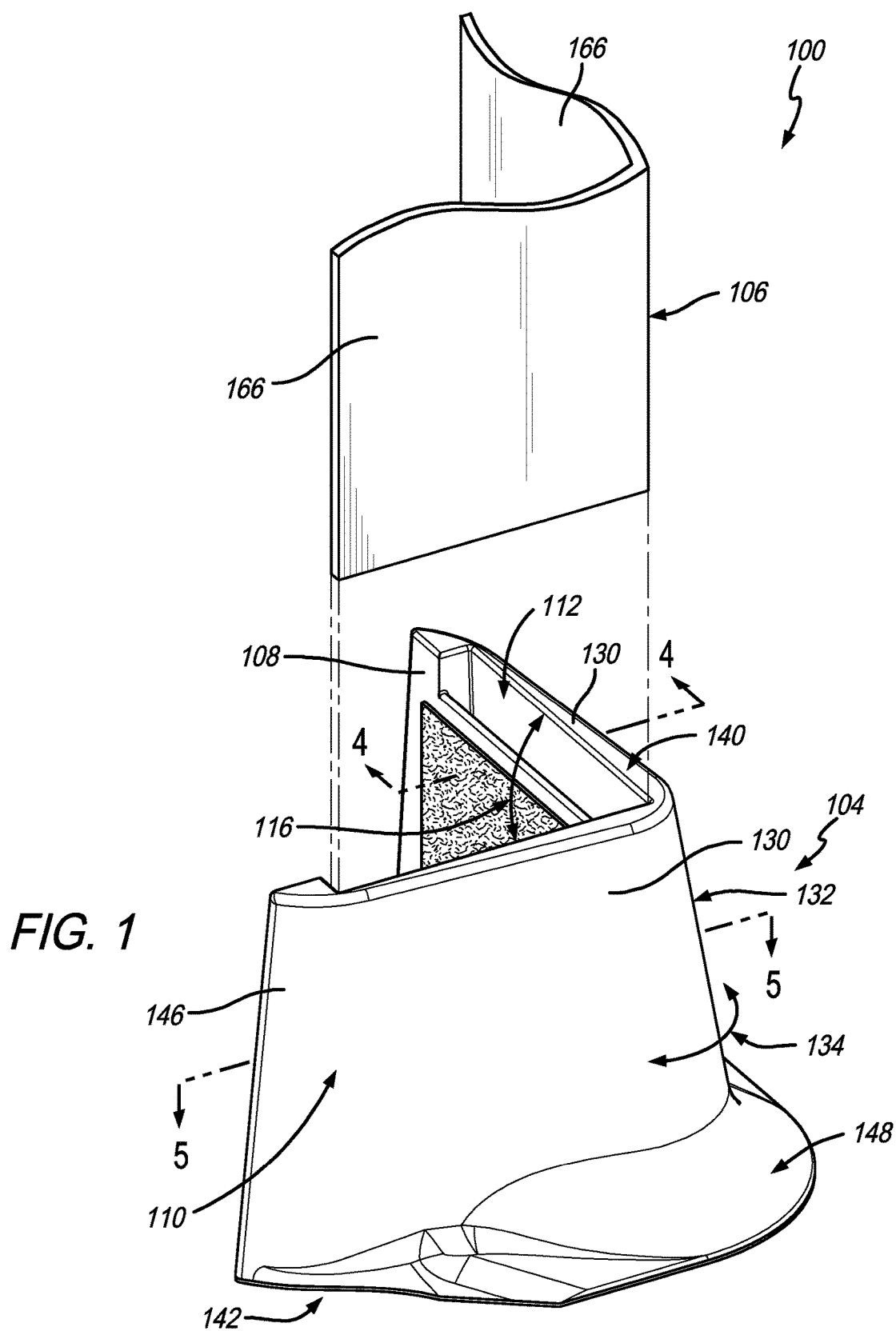
FIG. 1 is an exploded perspective view of a corner shield having features of the present invention.

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

Referring now to FIGS. 1-7, there is shown a corner shield 100 for placement on a substantially horizontal surface proximate to a corner 102 to be protected. The corner shield 100 comprises a body 104 and an elongated protector 106, wherein the body 104 comprises an inner support 108, an outer support 110, and a slot 112 between the inner and outer supports 108, 110.

Figure 2:
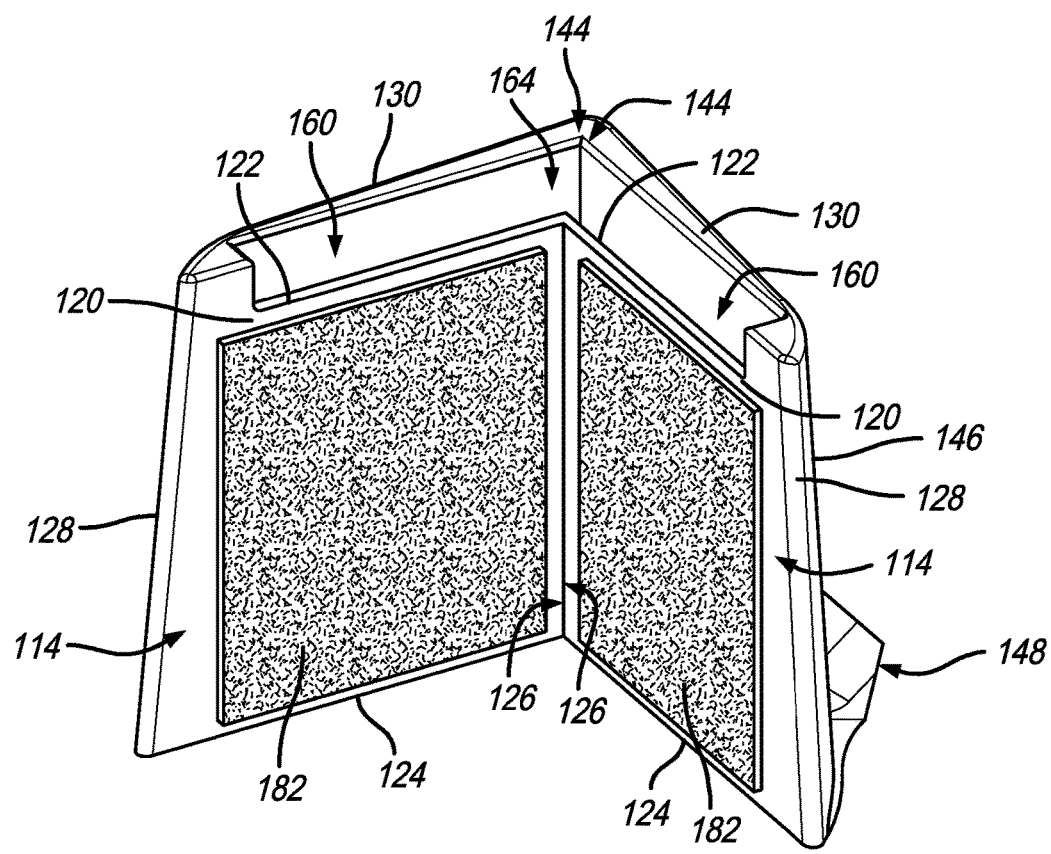
FIG. 2 is a perspective view of the corner shield of FIG. 1, wherein the inside of the corner guard is shown and the protector has been removed.
Figure 3:
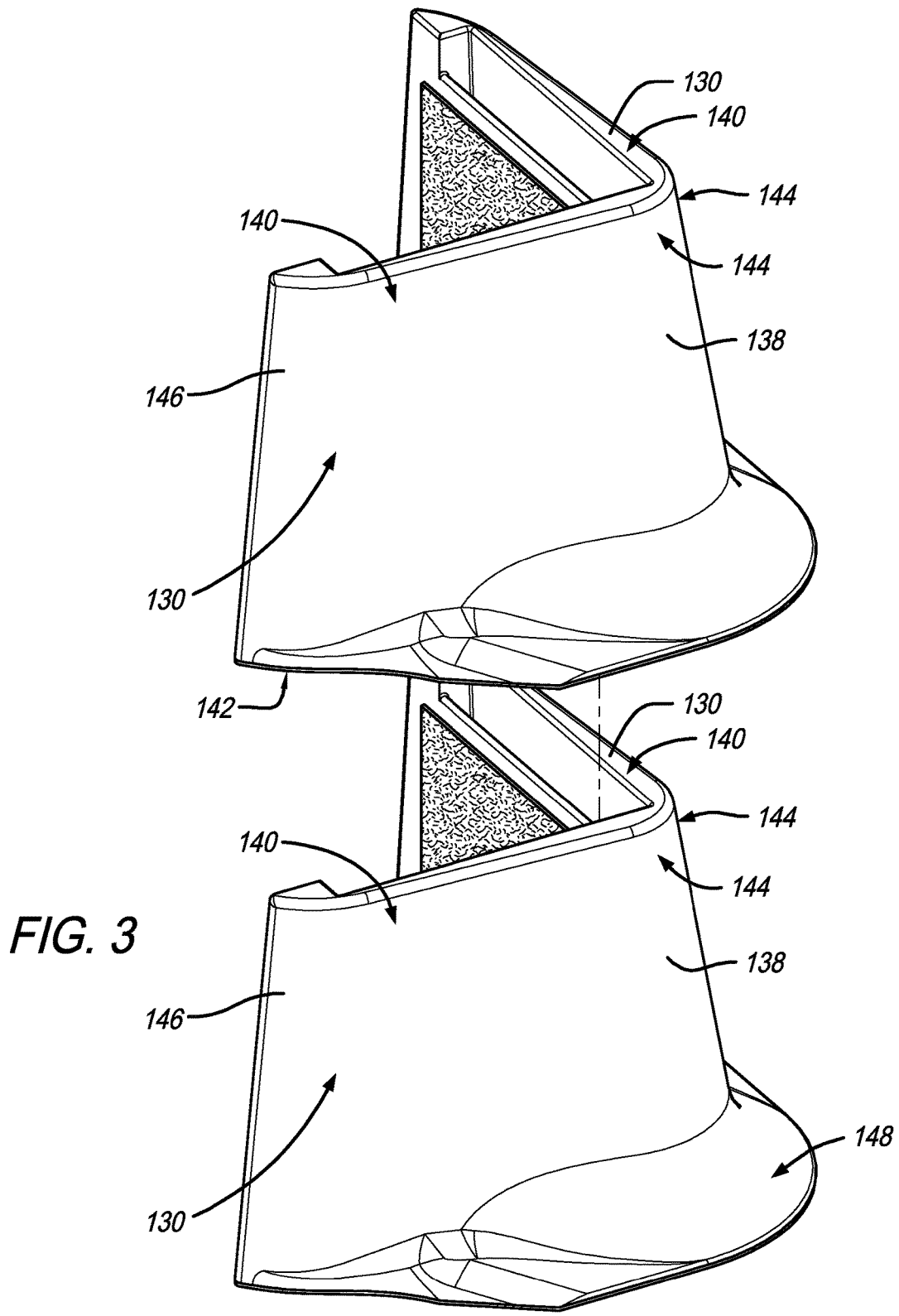
FIG. 3 is an exploded perspective view of the corner shield of FIG. 1, wherein a second corner shield is stacked on top of the first corner shield.
Figure 5:
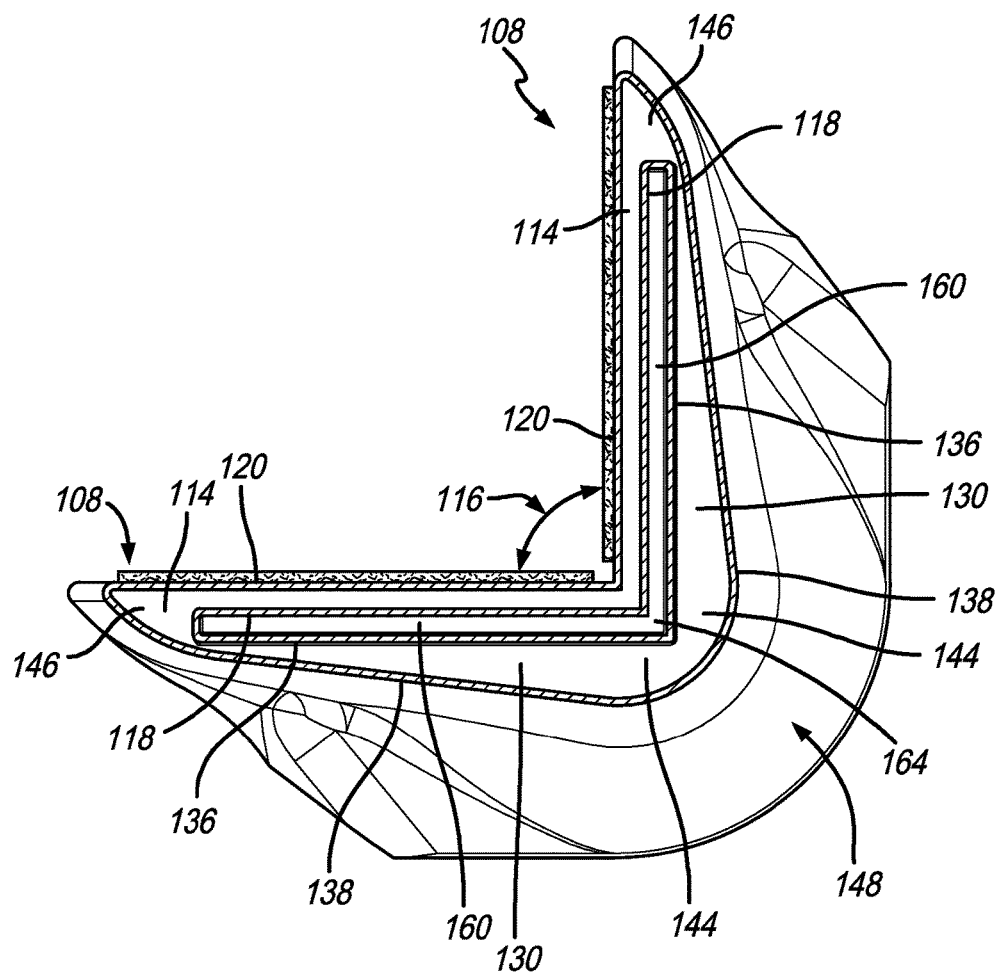
FIG. 5 is a horizontal sectional view of the corner shield body shown in FIG. 1, taken on line 4-4 of FIG. 1, with the protector shown in phantom.

As best shown in FIGS. 2 and 5, the inner support 108 comprises two sections or internal surfaces 114 connected together at a corner angle at arrow 116 of at least 30 degrees. Preferably the corner angle 116 is about 90 degrees. The two sections 114 each comprise an inner surface 118, an outer surface 120, a top edge 122, a bottom edge 124, an inner edge 126 and an outer edge 128. The inner surfaces 118 of the two sections 114 form an inner surface of the inner support 108 and the bottom edges 124 of the two sections 114 form a bottom of the inner support 108. The outer surfaces 120 of the two sections 114 are disposed proximate the corner structure 102 to be protected. Additionally, the two sections 114 each have a longitudinal axis perpendicular to the horizontal surface upon which the corner shield 100 can be placed. This means the inner surfaces 118 of the inner support 108 are also oriented to be substantially perpendicular to the surface on which the corner shield 100 is placed.

The outer support 110 comprises two sections 130 or external surfaces connected together at an outer support corner 132 with a corner angle at arrow 134. The corner angle 134 can be up to 180 degrees. The two outer support sections 130 each comprise an inner surface 136, an outer surface 138, a top edge 140, a bottom edge 142, an inner edge 144 and an outer edge 146. The outer surfaces 138 of the outer support sections 130 comprise an external surface of the outer support 110 and are disposed distal the corner structure 102 to be protected and can be curved or flat. The inner surfaces 136 of the two sections 130 comprise an inner surface of the outer support 110, and are disposed proximate the inner surfaces 118 of the inner support 108.

Figure 4:
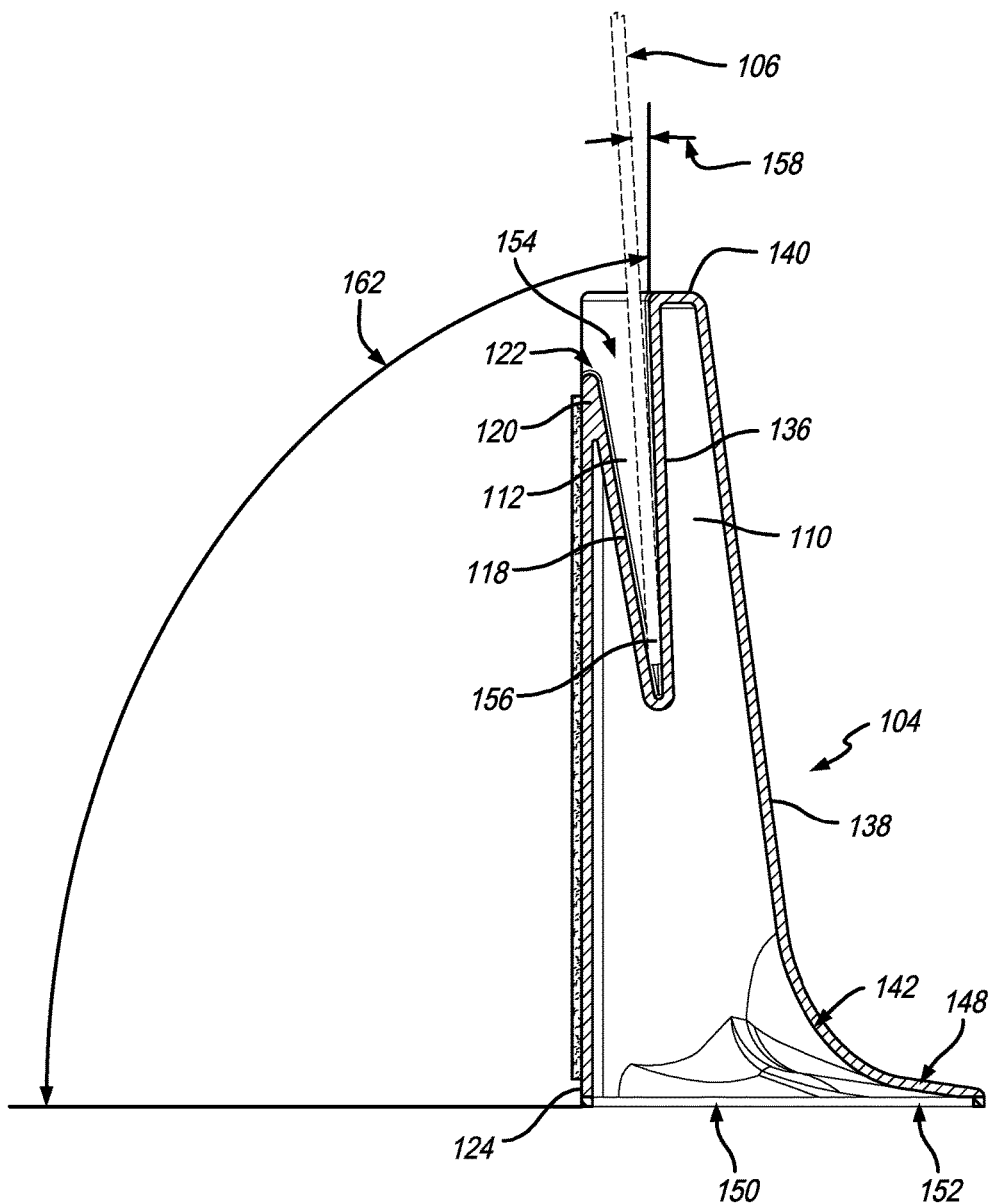
FIG. 4 is a vertical sectional view of the corner shield body shown in FIG. 1, taken on line 3-3 of FIG. 1, with the protector shown in phantom.

The bottom edges 142 of the outer surfaces 138 form a bottom of the outer support 110 and preferably a flange 148 is coupled to and extending away from the bottom edges 142 of the outer surfaces 138 of the outer support 110 for preventing the corner shield 100 from tipping over. Optionally, as shown in FIG. 4, an elastomer 150 can be disposed on at least a portion of a bottom surface 152 of the flange 148 for anti-slip purposes.

Figure 8:
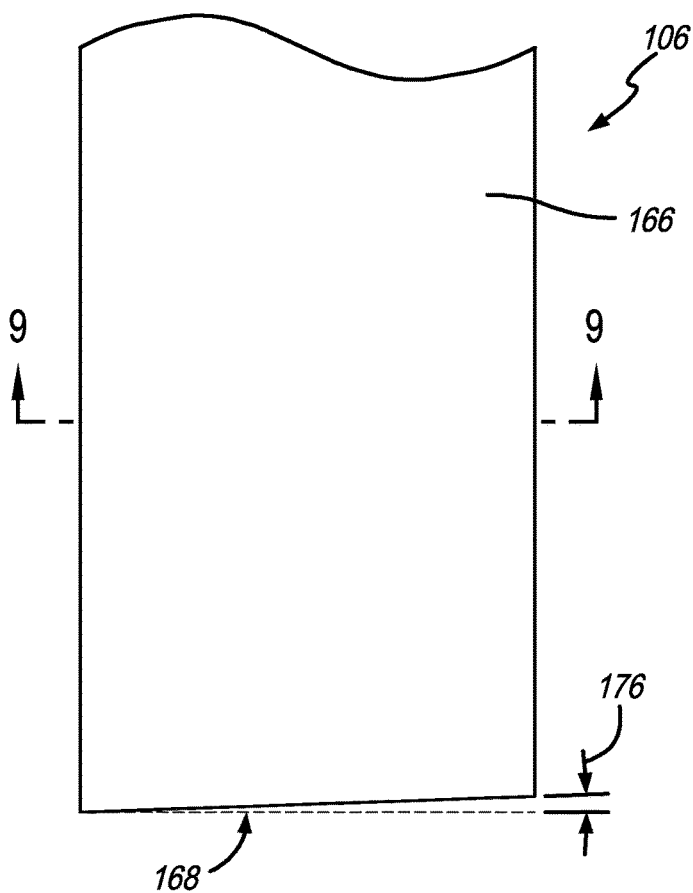
FIG. 8 is a front elevation view of a protector having features of the present invention, wherein the bottom edge of the protector is angled relative to the horizontal surface upon which the protector can be placed.
Figure 9:
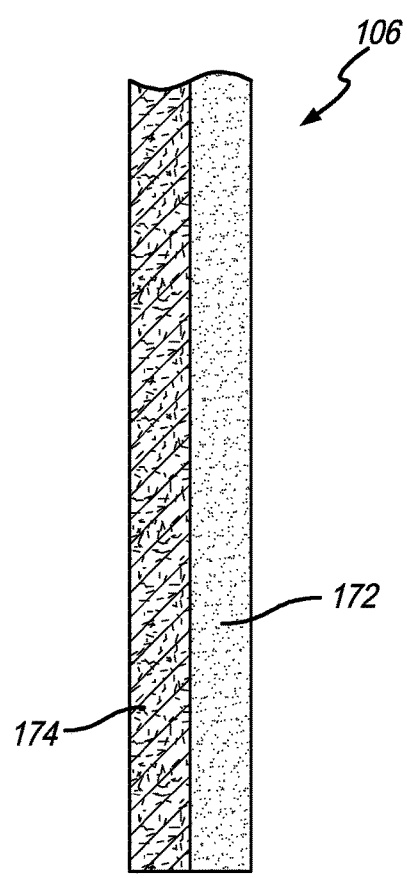
FIG. 9 is a horizontal sectional view of the protector shown in FIG. 8, taken on line 12-12 of FIG. 8.
Figure 10:
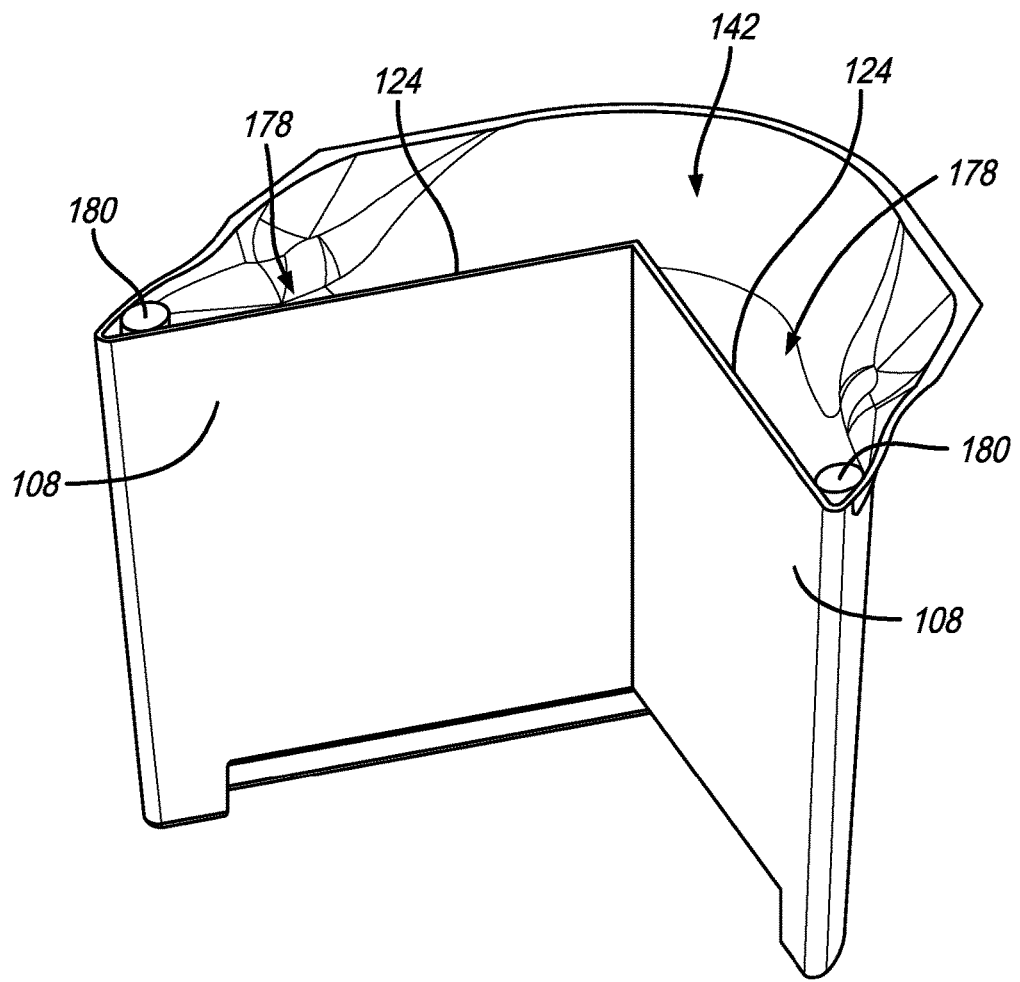
FIG. 10 is a perspective of the corner shield of FIG. 1, wherein the body of the corner shield has been turned upside down.

Optionally, the two inner support sections 114 are coupled together along their inner edges 126, and the two outer support sections 130 are coupled together along their inner edges 144, as shown in FIG. 2. However, this is not required. Alternatively, the inner edges 126, 144 can be disposed proximate each other, as shown in FIGS. 8-10.

Optionally, the top edge 140 of each outer support 110 external surface 138 can be coupled to the top edge 122 of its corresponding inner support 108 internal surface 118 and the outer edge (or end) 146 of each outer support 110 external surface 138 can be coupled to the outer edge (or end) 128 of its corresponding inner support 108 internal surface 118. This configuration provides the body 104 with a unitary construction. Thus the body 104, including any flange 148, can be provided as a unitary structure, typically made of a rigid material such as high-density polyethylene (HDPE), through the process of injection molding.

Preferably, the outer support 110 outer edges or end sections 146 are rounded and the outer surface 138 of the outer support 110 is curved, for tying cables or ropes thereon without having a sharp angle that could damage the tie.

Optionally, the bottom edge 124 of the inner support 108 and the bottom edge 142 of the outer support 110 are spaced apart from each other such that one or more corner shields 100 can be stacked upon/within each other, as shown in FIG. 2. The top edges 122, 140 of the inner and outer supports 108, 110 of a first corner shield 100 fit in between the bottom edges 124, 142 of the inner and outer supports 108, 110 of a second corner shield 100.

As best shown in FIG. 4, the slot 112 is disposed between the inner surface 136 of the outer support 110 and the inner surface 118 of the inner support 108. Optionally, the slot 112 is disposed along the top edges 122 of each internal surface 118 of the inner support 108. The slot 112 has a top 154 and a bottom 156. The inner surface 136 of the outer support 110 is angled inwardly from the bottom 156 to top 154 by a slope angle at arrow 158 of at least 2 degrees, and up to about 10 degrees from perpendicular relative to the horizontal surface that the corner shield 100 is placed on, or about 2 degrees with respect to the vertical axes of the two internal surfaces. Alternatively, the inner surface 136 of the outer support 110 is angled inwardly from the bottom 156 to top 154 by a slope angle at arrow 162 of at least about 80 degrees and up to about 88 degrees with respect to the horizontal surface on which the corner shield 100 can be placed. The slot 112 has a height from about 2.5 inches to about 3 inches and two sections 160 connected together at a slot corner 164 with the corner angle. The slot 112 is configured to receive the elongated protector 106.

Preferably the top of the slot 154 is wider than the bottom of the slot 156, such as the top of the slot 154 being one-half inch wide and the bottom of the slot 156 being less than ⅛th inch wide. Optionally the top of the slot 154 can be 1 inch wide. This allows the bodies 104 of multiple corner shields 100 to be stacked on top of each other and for ease of placement of the protector 106 into the slot 112.

The elongated protector 106 is shaped for fitting into the slot 112. The protector 106 has a length that is longer than the slot height 112. The protector 106 has two sections 166 connected together at the corner angle. Optionally the protector 106 can be provided with the two separate sections 166, wherein when inserted into the slot 112 the sections 166 are proximate to each other at the slot corner 164 with the corner angle.

Preferably the body 104 is sufficiently large to accommodate protectors 106 of different sizes, such as protectors 106 having sections 166 with widths of 6 inches. Thus, protectors 106 can be any length, have sections 166 of any width up to 6 inches, and have a thickness up to 375 inches. Preferably the dimensions of the protector 106 are 0.090 inches thick, 2.5 inches wide and 48 inches long/tall.

The protector 106 can be formed of cardboard, compressed paper, plastic or foam. For appearance, the protector 106 can have an exterior wherein at least the surface of the exterior of the protector 106 is covered with paper. Optionally, the protector 106 can also have a low density, polyethylene foam backing for providing additional protection to the corner 102 being protected. In use, the protector 106 is placed proximate to the corner 102 of an object to be protected, extending along the intersecting sections of the object, with the elongated protector 106 fitted into the slot 112.

Figure 6:
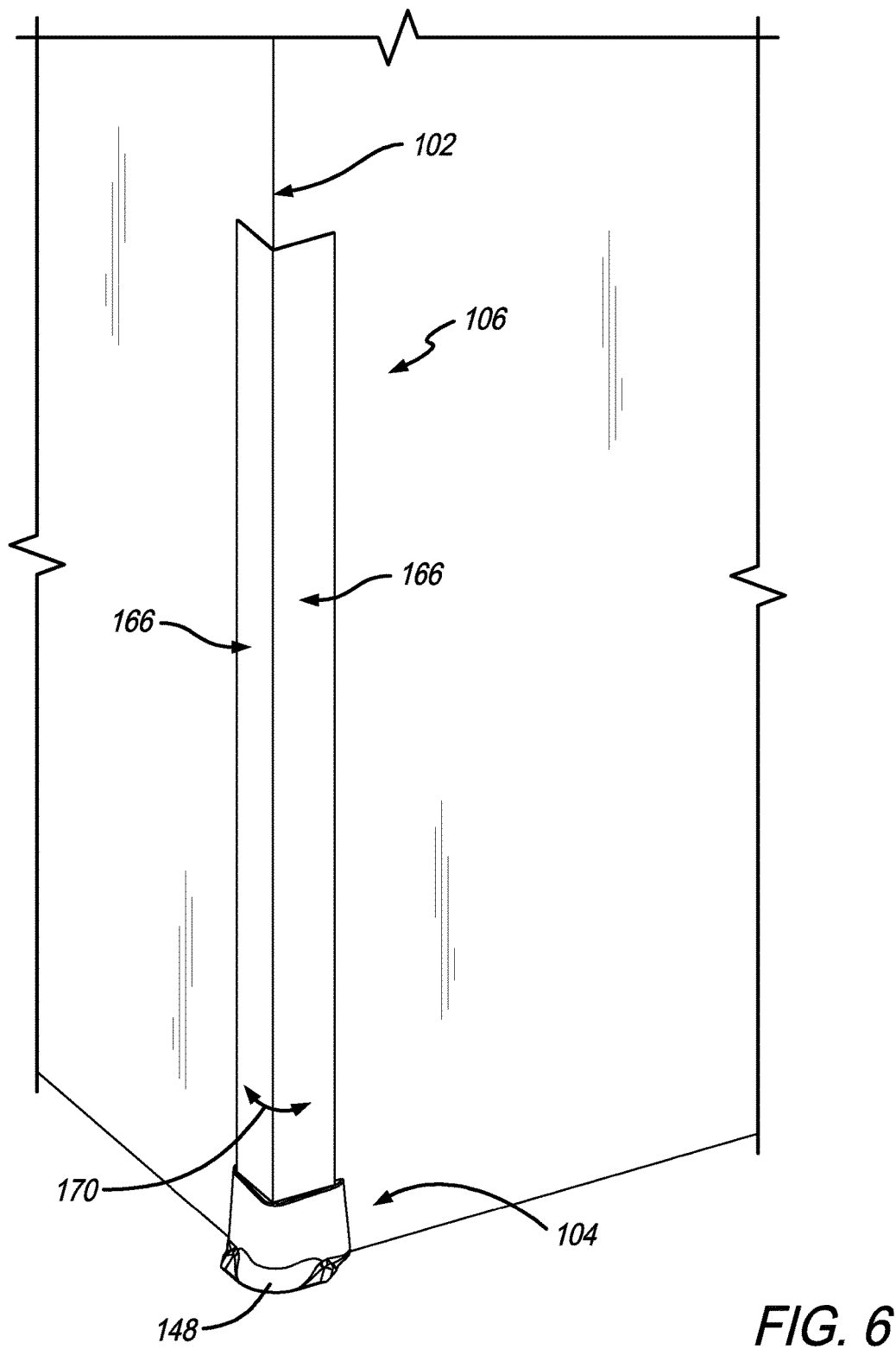
FIG. 6 shows the corner shield of FIG. 1 on the corner of walls intersecting at a corner.
Figure 7:
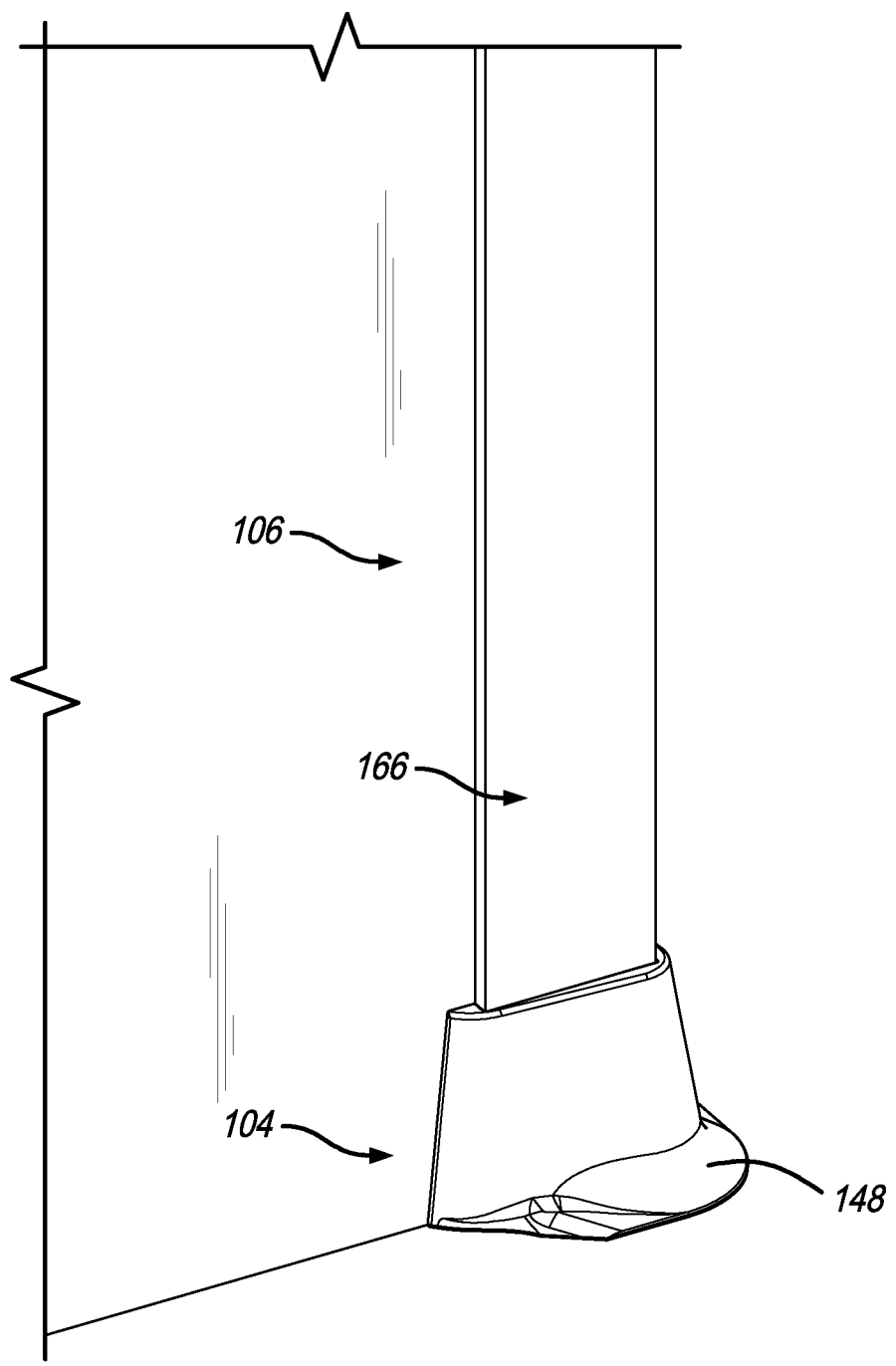
FIG. 7 is an enlarged view of the corner shield of FIG. 1 on the corner of walls intersecting at a corner.

In one version, as shown in FIGS. 6, 8 and 9, the protector 106 has a bottom edge 168 and the two sections 166 are connected together at a corner angle at arrow 170 of at least 30 degrees, each section 166 having a width of from about 2 to about 6 inches, a length of from about 36 to about 60 inches and a thickness of from about 0.05 to about 0.15 inch. The sections 166 each also comprise two layers. The first layer 172 comprises compressed paper with a thickness of from about 0.09 to about 0.18 inches, and the second layer 174 is for placement against the corner 102 to be protected and comprises low density polyethylene foam. The protector 106 is self-supporting such that it can stand on its bottom edge 168. The compressed paper of the first layer 172 has a density of from about 0.09 to about 0.18 g/cm³, and the foam of the second layer 174 has a density of from about 0.06 to about 0.13 g/cm³.

Optionally, as shown in FIG. 8, the bottom edge 168 of the protector 106 can be cut at least a 2 degree angle at arrow 176 with respect to the horizontal surface on which the protector 106 is to be placed. The angle 176 of the bottom edge 168 causes the protector 106 to lean towards the corner 102 it is to be protecting. This feature allows the protector 106 to be self-supporting, eliminating the need for the body 104 of the corner shield 100.

Additionally, as shown in FIG. 10, one or more cavities 178 can be disposed along the bottom 142 of the outer support 110. In one embodiment, a cavity 178 is disposed at at least one end of the bottom 142 of the outer support 110. However, the cavity 178 need not be at the end, and can be at any location on the bottom 142 of the outer support 110. Optionally, the bottom 142 of the outer support 100 comprises two spaced apart cavities 178, with one cavity 178 disposed at each end of the outer support 110. Optionally, the one or more cavities 178 are disposed between the bottom 124 of the inner support 108 and the bottom 142 of the outer support 110.

Optionally, one or more weights 180 can be disposed in the one or more cavities 178 for stability. The one or more weights 180 can each have a weight of about 2 to about 8 ounces, and can be made from metal, plastic or rubber. Optionally, the one or more weights 180 are disposed between the inner support 108 and outer support 110.

There can be shield material 182, such as felt or rubber, on at least a portion of the outer surface 120 of the inner support 108 for shielding the corner structure 102 that the corner shield 100 is being used to protect against marring. The shield material 182 can be in any pattern, including circles, rectangular strips, or large square pads that cover the entire outer surfaces 120 of the inner support 108, as shown in FIGS. 1 and 2.

In an alternate version of the invention (not shown), rather than having both an inner support 108 and outer support 100, the body 104 of the corner shield 100 can comprise only one support having an outer surface and an inner surface, with a protector holder coupled to the outer surface or the inner surface or both surfaces. The protector holder is angled from bottom to top by a slope angle of at least 2 degrees from perpendicular relative to the surface on which the body 104 is placed to tilt the protector 106 towards the corner 102 being protected.

Figure 11:
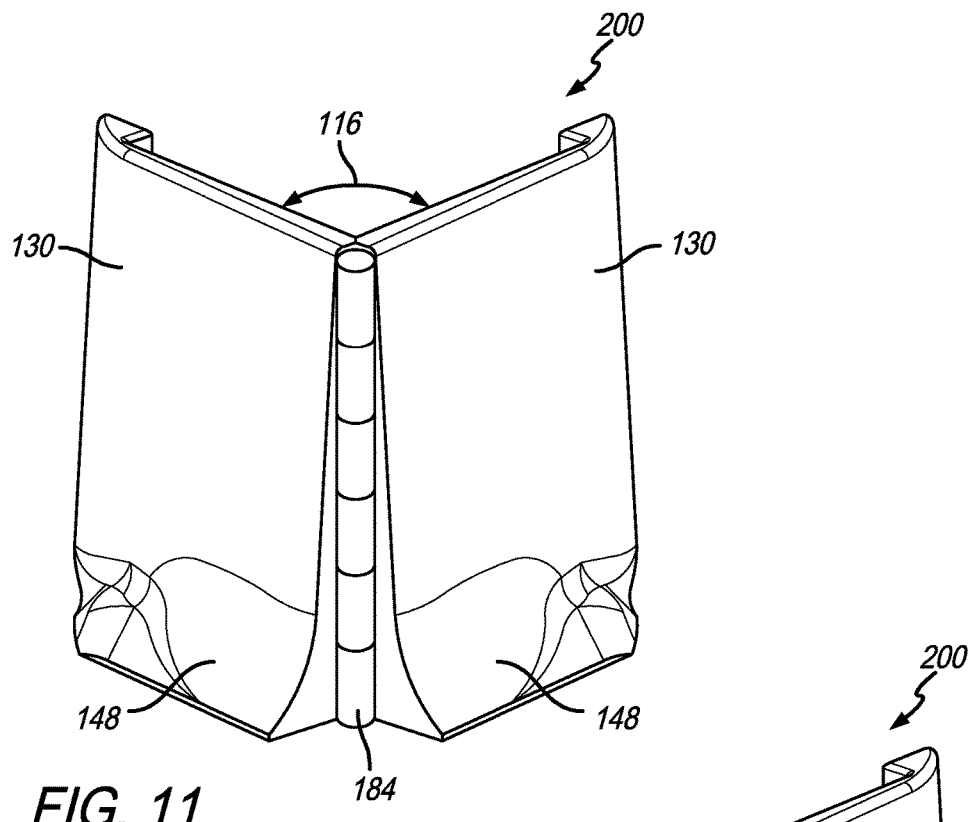
FIG. 11 is a perspective view of the outside of a hinged corner shield having features of the present invention.
Figure 12:
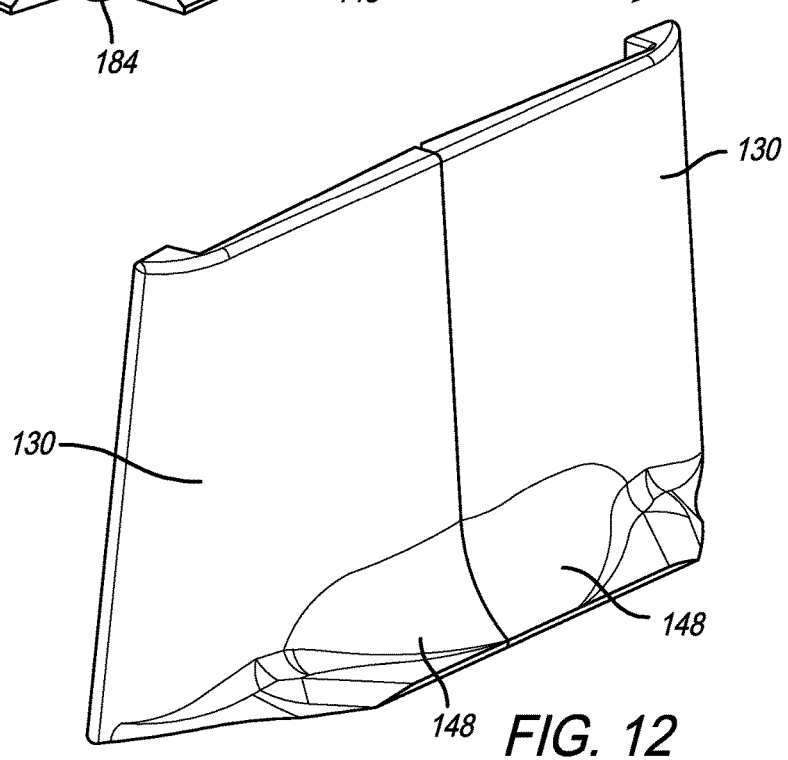
FIG. 12 is a perspective view of the hinged corner shield of FIG. 11, wherein the two sections have been fully opened.
Figure 13:
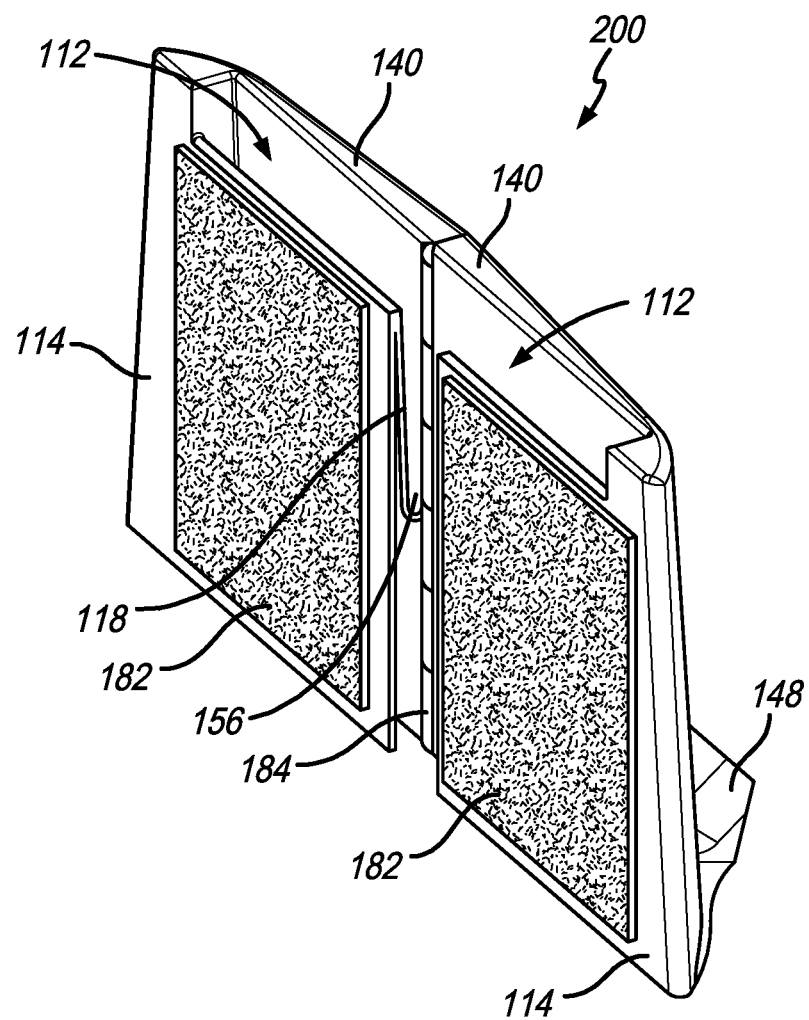
FIG. 13 is a perspective view of the inside of the hinged corner shield of FIG. 11.

Referring now to FIGS. 11-13, there is shown an alternate version of the invention, referred to as a hinged version 200. In the hinged version 200, the two outer support sections 130 are hinged together along their inner edges 144 via one or more hinges 184, and the slot 112 disposed between the inner surface 136 of the outer support 110 and the inner surface 118 of the inner support 108. The hinge 184 allows an adjustable corner angle 116 of at least 30 degrees and up to 180 degrees.

As can be seen in FIG. 13, the inner edges 126 of the inner support 108 are not coupled to each other and instead are disposed proximate each other. Depending on what the corner angle 116 is, there can be a gap between the inner edges 126.

Alternatively, the body 104 of the corner shield 100 can comprise a single support comprising two sections or walls hinged together at a corner, and a protector holder (not shown). The support has an outer surface and an inner surface and the hinge allows a corner angle of at least 30 degrees, and up to 180 degrees.

The protector holder is coupled to either or both the outer surface or the inner surface, and is angled from bottom to top by a slope angle of at least 2 degrees from perpendicular relative to the surface on which the body 104 is to be placed to tilt the protector 106 toward the corner.

Alternatively, the protector holder can be an inner support comprising two sections proximate to each other at an inner support corner with the corner angle, the inner support having an inner surface, and the slot is disposed between the inner surface of the outer support and the inner surface of the inner support (not shown).

The invention can also be provided as a kit comprising the corner shield body 104 and at least two protectors 106 wherein at least one protector 106 has a size different from another protector 106 in height or width or both of at least one inch.

Optionally, the protector 106 can be provided separately from the corner shield body 104, such that a user is able to replace protectors 106 as they wear out from use.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended features should not be limited to the description of preferred embodiments contained in this disclosure. All references cited herein are incorporated by reference in their entirety.

What is claimed is:

1. A corner shield for placement on a substantially horizontal surface, the corner shield comprising:
    a body comprising:
        an inner support comprising two sections connected together at an inner support corner with a corner angle of about 90 degrees, the support having an outer surface and a bottom:
        an outer support comprising two sections connected together at an outer support corner with the corner angle, the support having an inner surface and a bottom, the outer support having end sections that are rounded;
        a slot having a top and a bottom, the slot being between the inner surface of the outer support and the outer surface of the inner support, the inner surface of the outer support being angled inwardly from the bottom to the top by a slope angle of about 2 degrees from the perpendicular relative to the surface, the slot having a height and two sections connected together at a slot corner with the corner angle, where in the slot is V-shaped with the top of the slot wider than the bottom of the slot;
        a flange extending from the bottom of the outer support outwardly for preventing the corner shield from tipping over;
        at least one weight at the bottom of the outer support; and
        an elongated cardboard protector shaped for fitting into the slot, the protector being longer than the slot height, the protector having two sections connected together at a corner with the corner angle.

2. A corner shield for placement on a substantially horizontal surface and protecting a corner of a structure, the corner shield comprising
    a body comprising:
        an inner support comprising two sections connected together at an inner support corner with a corner angle of about 30 degrees, the inner support having an inner surface:
        an outer support comprising two sections connected together at an outer support corner with the corner angle, the support having an inner surface, the outer support has a bottom and the corner shield comprises a cavity at the bottom of the outer support;
        a weight in the cavity; and
        a slot having a top and a bottom, the slot being between the inner surface of the outer support and the outer surface of the inner support, the inner surface of the outer support being angled inwardly from the bottom to the top by a slope angle of about 2 degrees from perpendicular relative to the substantially horizontal surface upon which the corner shield can be placed, the slot having a height and two sections connected together at a slot corner with the inner support corner angle.

3. The corner shield of claim 2 wherein the weight can have weight of about 2 to 8 ounces.

4. The corner shield of claim 2 wherein the weight can be made of metal, plastic or rubber.

5. The corner shield of claim 2 wherein the weight is disposed between the inner support and the outer support.

6. A corner shield for placement on a substantially horizontal surface and protecting a corner of a structure, the corner shield comprising:
    a body comprising:
        an inner support comprising two sections connected together at an inner support corner with a corner angle of about 30 degrees, the inner support having an inner surface:
        an outer support comprising two sections connected together at an outer support corner with the corner angle, the support having an inner surface; the outer support has a bottom and comprising two spaced apart cavities at the bottom of the outer support, each cavity contains a weight of about 2 to about 8 ounces; and
        a slot having a top and a bottom, the slot being between the inner surface of the outer support and the outer surface of the inner support, the inner surface of the outer support being angled inwardly from the bottom to the top by a slope angle of about 2 degrees from perpendicular relative to the substantially horizontal surface upon which the corner shield can be placed, the slot having a height and two sections connected together at a slot corner with the inner support corner angle.

7. The corner shield of claim 6 wherein the weight can be made of metal, plastic or rubber.

8. The corner shield of claim 6 wherein the weight is disposed between the inner support and the outer support.

9. A corner shield for placement on a substantially horizontal surface and protecting a corner of a structure, the corner shield comprising:
    a body comprising:

an inner support comprising two sections connected together at an inner support corner with a corner angle of about 30 degrees, the inner support having an inner surface:

an outer support comprising two sections connected together at an outer support corner with the corner angle, the support having an inner surface; the outer support has a bottom and comprising at least one weight at the bottom of the outer support; and a slot having a top and a bottom, the slot being between the inner surface of the outer support and the outer surface of the inner support, the inner surface of the outer support being angled inwardly from the bottom to the top by a slope angle of about 2 degrees from perpendicular relative to the substantially horizontal surface upon which the corner shield can be placed, the slot having a height and two sections connected together at a slot corner with the inner support corner angle.

10. The corner shield of claim 9 wherein the weight can have weight of about 2 to 8 ounces.

11. The corner shield of claim 10 wherein the weight can be made of metal, plastic or rubber.

12. The corner shield of claim 10 wherein the weight is disposed between the inner support and the outer support.

* * * * *